(12) United States Patent
Haque

(10) Patent No.: US 7,654,818 B2
(45) Date of Patent: Feb. 2, 2010

(54) HOT RUNNER NOZZLE SYSTEM

(75) Inventor: Zakiul Haque, Essex, VT (US)

(73) Assignee: Husky Injection Molding Systems Ltd., Bolton (CA)

(*) Notice: Subject to any disclaimer, the term of this patent is extended or adjusted under 35 U.S.C. 154(b) by 219 days.

(21) Appl. No.: 12/039,363

(22) Filed: Feb. 28, 2008

(65) Prior Publication Data

US 2009/0220632 A1    Sep. 3, 2009

(51) Int. Cl.
B29C 45/20    (2006.01)
(52) U.S. Cl. .................. 425/549; 264/328.15
(58) Field of Classification Search .......... 425/549; 264/328.15
See application file for complete search history.

(56) References Cited

U.S. PATENT DOCUMENTS

| | | | |
|---|---|---|---|
| 5,299,928 A | 4/1994 | Gellert | |
| 6,315,549 B1 | 11/2001 | Jenko et al. | |
| 6,609,902 B1 | 8/2003 | Blais et al. | |
| 6,832,909 B2 * | 12/2004 | Bazzo et al. | 425/549 |
| 6,960,073 B2 * | 11/2005 | Bazzo et al. | 425/549 |
| 6,971,868 B2 | 12/2005 | Ciccone | |

* cited by examiner

Primary Examiner—Tim Heitbrink

(57) ABSTRACT

A hot runner nozzle system (500) comprising a nozzle tip (100) adjacent to a nozzle (405) in series, and a retainer (400) adjoining both the nozzle tip (100) and the nozzle (405) in parallel, the retainer (400) having a first retainer thread (435), for connection to a nozzle thread (420) to form a first seal (450) between the nozzle end (440) of the retainer (400) and a nozzle shoulder (430), a second retainer thread (460), for connection to a tip thread (455) to form a second seal (470) between the inlet end (475) of the nozzle tip (100) and the gate end (425) of the nozzle (405), a seal ring (115) for creating a gate seal (496) with a gate insert (120), and a plurality of flats (410) thereon to facilitate torquing of the retainer (400) to the nozzle (405), the torque value applied to the retainer (400) being about two to four times of that applied to the nozzle tip (100) to facilitate removal of the nozzle tip (100) independent of the retainer (400).

9 Claims, 9 Drawing Sheets

TABLE OF MATERIAL PROPERTIES

| Material @ 300C | Rc | K | Sut | Sy | Se | Higher Se |
|---|---|---|---|---|---|---|
| H13- RC (Nozzle) | 42-44 | 26.1 | 1334 | 1197 | 299 | |
| H13 (Retainer) | 49-52 | 26.1 | 1546 | 1160 | 345 | 15% |
| Ph13-8 (Retainer) | 40-43 | 18.2 | 1095 | 1027 | 377 | 26% |
| Custom 465 (Retainer) | 46-49 | 21.5 | 1390 | 1310 | 502 | 68% |
| 4340 (Retainer) | 46-48 | 41.5 | 1451 | 1195 | 530 | 77% |
| Aermet 100 (Retainer) | 53-54 | 32 | 1665 | 1517 | 568 | 90% |
| Vascomax C-300 (Retainer) | 50-55 | 28.5 | 1770 | 1693 | 672 | 125% |

K=thermal conductivity (W/mC), Sut=Ultimate strength, MPa. Sy=Yield Strength, MPa, Se=Endurance limit, MPa

FIG. 7

HOT RUNNER NOZZLE SYSTEM

CROSS REFERENCES

None.

TECHNICAL FIELD OF THE INVENTION

The present invention relates generally to the field of injection molding equipment and, more particularly, to a hot runner nozzle system whereby a nozzle tip and a retainer are threadably secured to a nozzle.

BACKGROUND OF THE INVENTION

A hot runner is utilized to transfer molten material, typically plastic resin, from an injection molding machine to a mold. A hot runner generally includes a manifold plate, a manifold housed in the manifold plate, and a backing plate that encloses the manifold in the manifold plate. The manifold, typically heated via a plurality of tubular heaters embedded therein, routes molten resin from a sprue bushing, which mates with an injection unit on an injection molding machine, to a plurality of nozzles which inject the molten resin into cavities in the mold. The manifold divides the flow of the molten resin into a network of a plurality of melt channels as it flows from the sprue bushing to the nozzles, all the while maintaining a near constant temperature of the resin throughout.

The state of the art includes various nozzles and nozzle tips for a hot runner which is typically of either a valve gate style or a hot tip style. In the valve gate style, a valve stem reciprocates within the nozzle, nozzle tip and a gate orifice acting as a valve to selectively preclude or allow the flow of resin through the nozzle tip and into a mold cavity. In the hot tip style, a small volume of resin at the end of the nozzle tip, in the gate orifice, solidifies during each molding cycle thus precluding the flow of resin into the mold cavity. The present invention describes the hot tip style nozzle.

It is important to note that the nozzle tip is subject to many influences which help determine its size and makeup. The nozzle tip must be able to withstand loads from injection pressures that may reach 40,000 psi (275 MPa) or more, endure corrosion and chemical attack, and resist abrasion and wear from resins filled with glass or other particulate materials. Paramount to the nozzle tip is its ability to provide the correct amount of heat to the gate orifice to allow sufficient flow of resin to the mold cavity yet promote solidification of the resin once the mold cavity is filled. To enable this feature, a heater is installed to encircle the nozzle in an area proximate to the nozzle tip, and the nozzle tip is typically constructed of a highly thermally conductive alloy, usually a copper alloy, which, by nature, tends to be relatively low in hardness. All these factors contribute to the nozzle tip eventually wearing out or failing thus necessitating its replacement, generally more frequently than most other components usually replaced during regular, periodic maintenance of the hot runner. For this reason, it is desirable to be able to service the nozzle and the nozzle tip in a quick and efficient manner without necessarily disassembling the entire hot runner or even removing and re-wiring the heater.

A common, and simple, nozzle housing and nozzle tip configuration involves a nozzle tip, having a male thread, being installed into a nozzle housing which has a female thread. The nozzle housing, typically made of a high-hardness tool steel, extends over the nozzle tip, beyond the threaded connection, to include, at its end, a thin, raised band of material; a seal ring, configured to fit diametrically inside a similarly sized bore in a gate insert within a mold, with some clearance at room temperature, such that at operating temperature, its radial, thermal expansion creates a gate seal therebetween to preclude molten resin from leaking between the seal ring and the gate insert.

When the mold, and consequently, the gate insert, is removed from the hot runner during maintenance or product changeover, the seal ring of the nozzle housing is disengaged from the bore of the gate insert. Though there is a nominal clearance between the two surfaces at room temperature, if disassembly is performed before the nozzle housing has cooled sufficiently from its operating temperature to reduce its radial, thermally-expanded diameter, or if the two surfaces are slightly misaligned, the result will be abrasion of the two mating surfaces. Any slight scratches or abrasion of the seal ring on the nozzle housing may potentially provide a path for pressurized, molten resin to leak by, during operation, resulting in catastrophic damage to the hot runner. Over time, this abrasion will require replacement of the entire nozzle housing to prevent, or repair from, resin leakage, thus necessitating significant down time of the hot runner for its maintenance as the entire hot runner must be disassembled in order to remove the nozzle housing from between the manifold plate and the manifold.

The thin section of the seal ring of the nozzle housing is also its weakest point, and is subjected to the same high injection pressures as the nozzle tip. The trend of the injection molding industry to reduce the cost of a molded part by reducing the amount of resin required to fill it, necessitates a thinner molded part wall thickness thus requiring higher injection pressures. To utilize stronger materials to make the seal ring of the nozzle housing more robust, is cost prohibitive as the seal ring and the entire length of the nozzle housing and are integral.

To address these needs and concerns, a two piece tip assembly is commonly utilized, as is illustrated in U.S. Pat. No. 6,609,902 B1 to Blais et al, for example. A removable tip insert is secured against a nozzle by a tip retainer which is typically threadably connected to the nozzle, whereby a flange of the tip insert is trapped by a mating shoulder of the tip retainer. The tip retainer also has the added feature of having the seal ring included at its gate end. The relatively inexpensive tip insert can be removed and replaced by unscrewing the tip retainer, installing a new tip insert, and re-attaching the tip retainer. Such a tip arrangement is cost effective in that the tip retainer is not discarded.

However, this two piece design is not without its limitations. In order to create sufficient seal force, the flange of the tip insert is subjected a high torque load by the retainer, creating a stress concentration at the corner of the flange and the tip insert. When subjected to resin at operating temperature and pressure, the tip insert is prone to cracking and failing at the base of the flange. Additionally, the cumulative design of the flange and retainer assembly imposes restrictive size limitations on the diameters of the components thereby limiting the injection pressures and loads they may withstand.

For the foregoing reasons, the present invention is directed to overcoming one or more of the problems or disadvantages set forth above, and for providing a hot runner nozzle system with replaceable componentry capable of withstanding high injection pressures.

SUMMARY OF THE INVENTION

One aspect of the present invention is to provide a hot runner nozzle system which comprises a nozzle tip which abuts a nozzle in series, while a retainer adjoins both the nozzle tip and the nozzle in parallel.

In accordance with the above aspects of the invention, there is provided a retainer, having a first retainer thread, which connects to a nozzle, having a nozzle thread, creating a first seal where the nozzle end of the retainer contacts the nozzle shoulder. The retainer has a plurality of flats thereon to facilitate torquing on to the nozzle thread. To prevent resin leakage beyond the gate insert of the mold, the retainer is configured to have a seal ring at its gate end such that, when heated, radial, thermal expansion of the outer diameter of the seal ring will make forced contact with the gate insert, thus precluding the passage of pressurized molten resin during operation. A second seal is created whereby the nozzle tip, having a tip thread which engages a second retainer thread during installation, is torqued into the retainer, forming the second seal with the nozzle housing to preclude resin leakage from the melt channel.

In another embodiment of the present invention, the wall thickness of the retainer is reduced, owing to the implementation of a higher strength material, while the wall thickness of the nozzle tip is increased to accommodate high pressure applications.

In yet another embodiment of the present invention, the wall thickness of the retainer is reduced, owing to the implementation of a higher strength material, while the wall thickness of the nozzle tip remains unchanged, providing for a thicker layer of insulative resin to occupy a gap therebetween.

These aspects are merely illustrative of the various aspects associated with the present invention and should not be deemed as limiting in any manner. These and other objects, aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 7 is a chart illustrating the comparative strength and hardness values of choice materials for the retainer versus the nozzle.

DETAILED DESCRIPTION

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

Figure 1A:
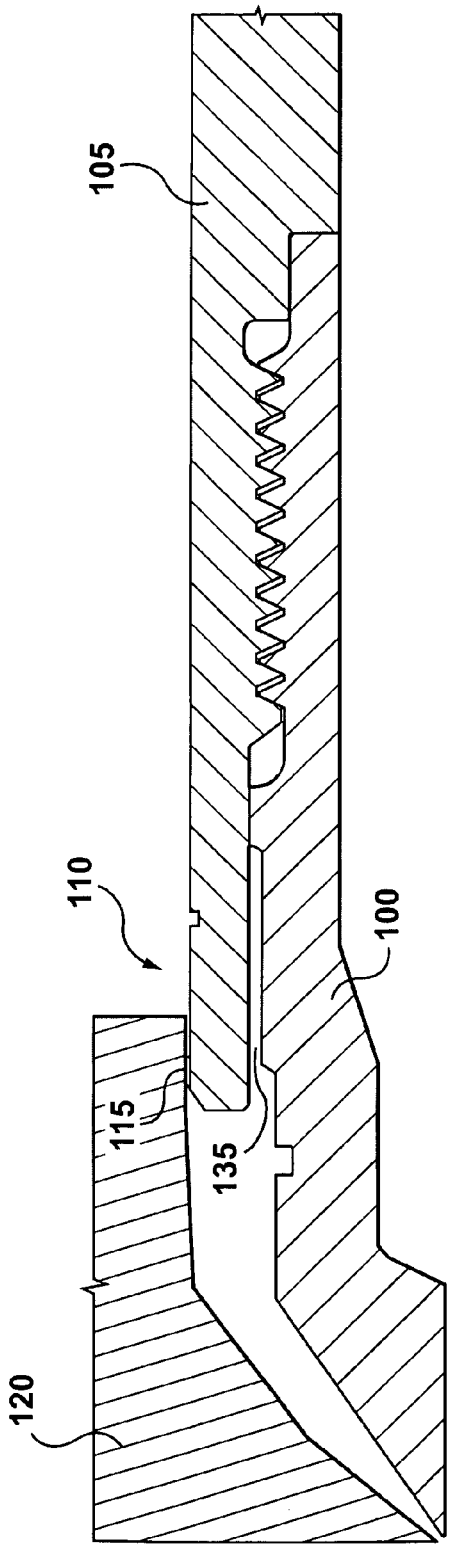
FIG. 1A is a partial cross-sectional view of a typical nozzle tip threadably installed in a one piece nozzle housing as is known in the prior art.

The prior art of FIG. 1A shows a nozzle tip 100 threadably engaged with a nozzle housing 105 for the purpose of understanding the function and interaction of each component. The nozzle housing 105 has a tip end 110 which is integral with the nozzle housing 105 in its entirety and therefore both aspects are made of one material suitable for the temperatures and pressures for which it is intended. Situated at the tip end 110 is a seal ring 115, being a precisely sized, raised band of material, the outer diameter of which thermally expands to contact a gate insert 120, on its inner diameter to seal and prevent the flow of resin thereby. The intimate contact between the seal ring 115 and the gate insert 120 results in abrasion and wear of the seal ring 115 which, over time, would allow resin to leak by, necessitating removal of the nozzle housing 105 as a whole for replacement of the seal ring 115, an undertaking requiring complete disassembly of a hot runner system (not shown).

Figure 1B:
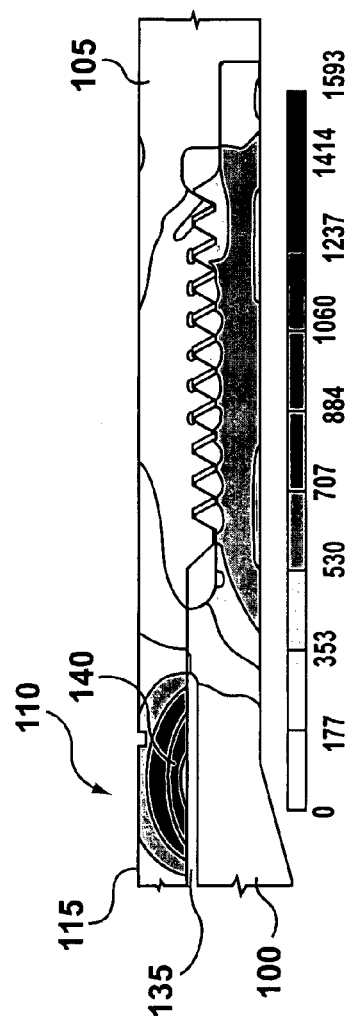
FIG. 1B is a partial cross-sectional view of a finite element analysis of the nozzle tip and one piece nozzle housing shown in FIG. 1A showing stresses under load.

The finite element analysis of FIG. 1B illustrates the forces generated by the loads endured under operating conditions during the injection molding process on the nozzle tip 100 and the nozzle housing 105. When molten resin is injected under pressure into a mold cavity (not shown), it also surrounds the nozzle tip 100 and enters a chamber 135 where it acts to insulate the heat conducted by the nozzle tip 100 to the tip end 110 of the nozzle housing 105 as well as enhancing the sealing mechanism. The pressurized resin exerts an outward force on the tip end 110 and since the tip end 110 is unsupported behind the seal ring 115, a first high stress concentration 140 occurs there. In an effort to combat the first high stress concentration 140 and to prevent failure of the nozzle housing 105 in this area, a sufficiently strong material is desirable, but because of the integral design of the nozzle housing 105 and tip end 110, the overall cost could be prohibitive. Therefore, the tip end 110 of the nozzle housing 105 must be made sufficiently thick to withstand such loads, thereby decreasing the insulative thickness of the chamber 135, resulting in undesired conduction of heat away from the nozzle tip 100 and nozzle housing 105.

Figure 2:
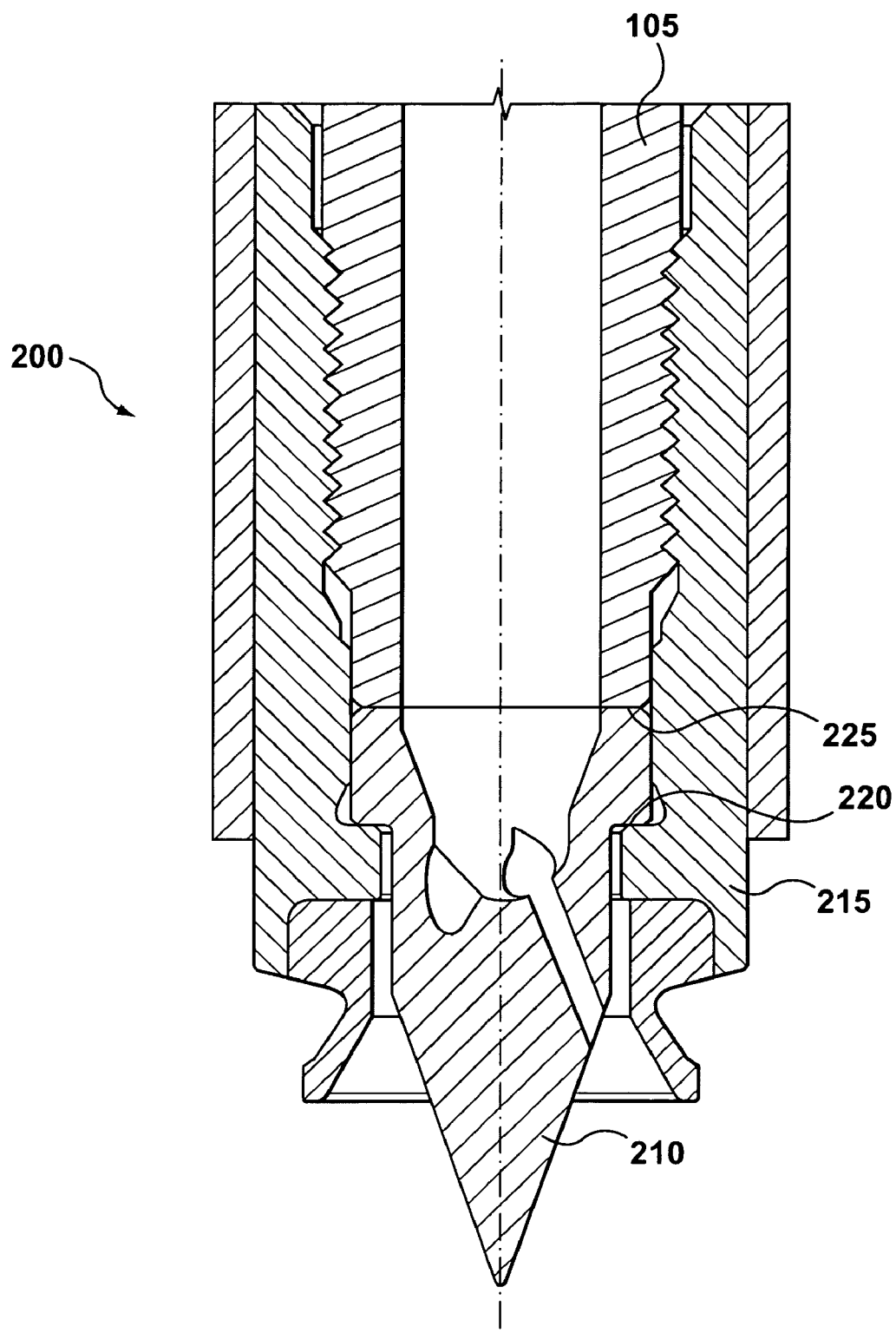
FIG. 2 is a sectional view of a tip insert and tip retainer assembly known in the prior art.
Figure 3:
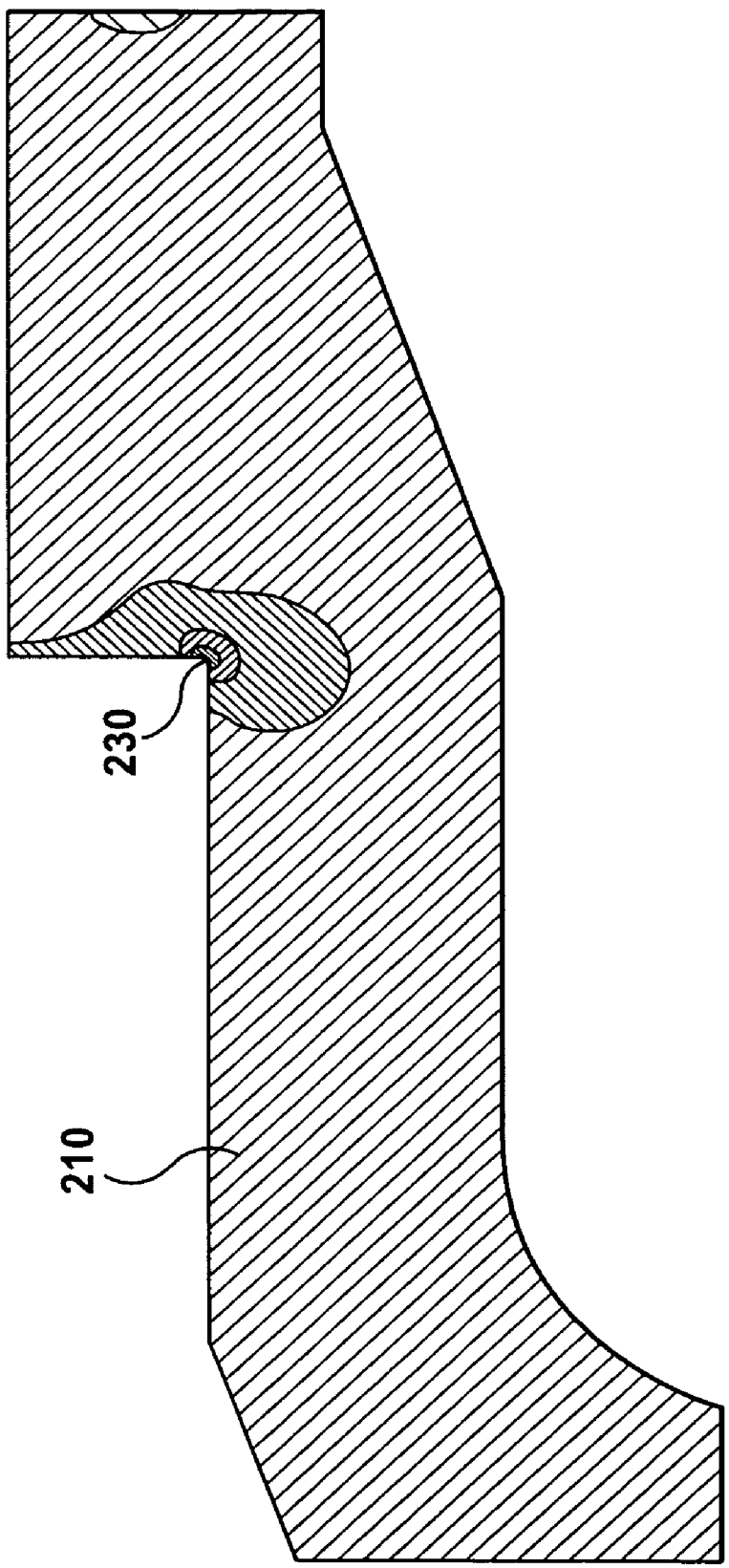
FIG. 3 is a partial cross-sectional view of a finite element analysis of the tip insert of FIG. 2 showing stresses under load.

A two piece design 200 comprising a nozzle housing 105, a tip insert 210 and a tip retainer 215, as shown in the prior art of FIG. 2 from U.S. Pat. No. 6,609,902 B1 to Blais et al, illustrates how a flange 220 of the tip insert 210 is trapped between the tip retainer 215 and the nozzle housing 105 when the tip retainer 215 is threadably attached to the nozzle housing 105. The tip insert 210 is subjected to a compressive load on the flange 220 as the tip retainer 215 is torqued onto the nozzle housing 105 to ensure sufficient seal off pressure is created between the tip insert 210 and the nozzle housing 205 at an interface 225. In doing so, a second high stress concentration 230 is created at the corner of the flange 220, as illustrated in FIG. 3, resulting in potential failure of the tip insert 210 over time or under high operating temperatures and pressures.

Figure 4:
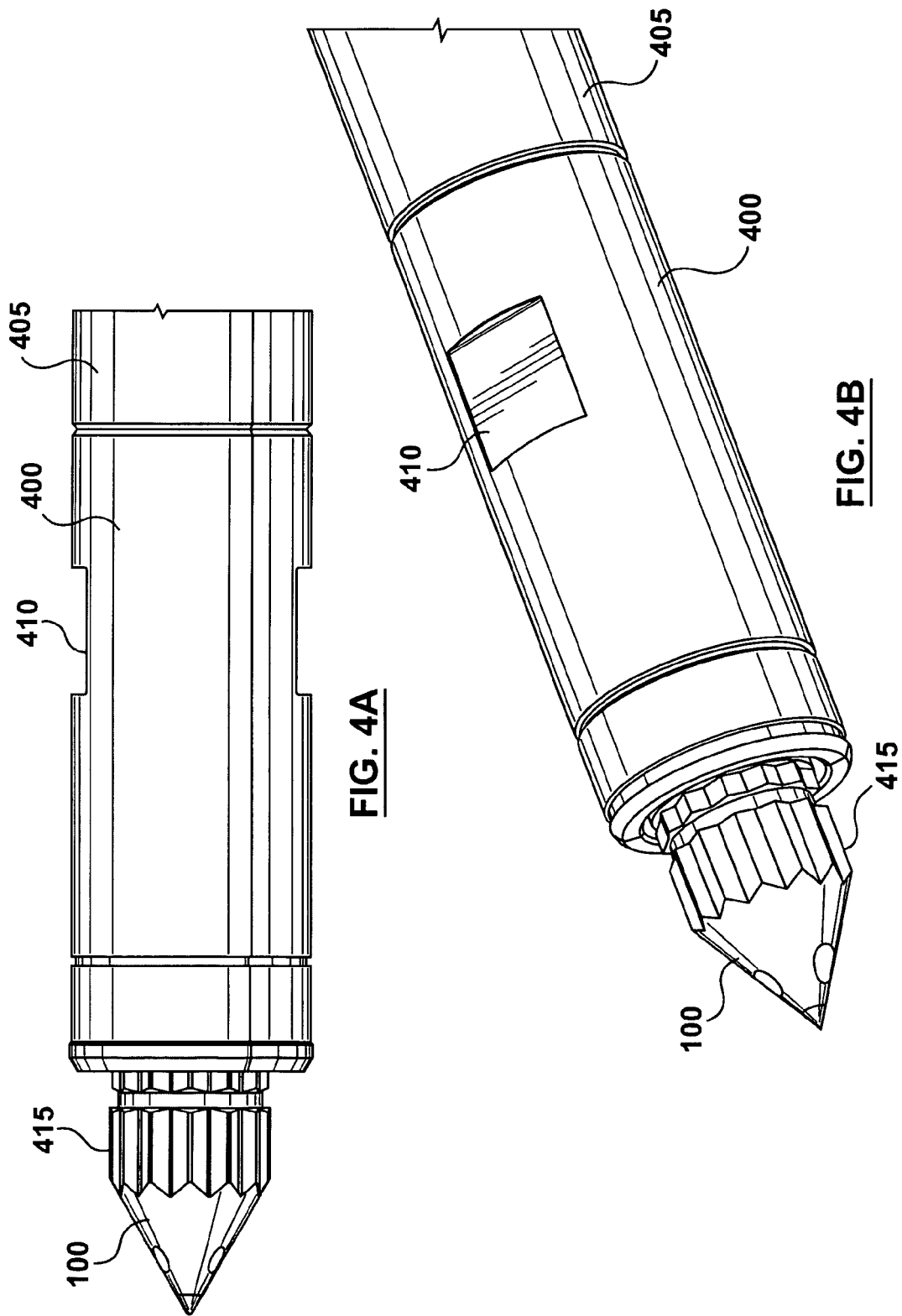
FIG. 4A is a view of the exterior of the present invention showing the flats used to torque the retainer onto the nozzle.
FIG. 4B is an isometric view of the exterior of the present invention showing a flat used to torque the retainer onto the nozzle.

Referring now to an embodiment of the present invention shown in FIGS. 4A and 4B, to facilitate attachment of a retainer 400 to a nozzle 405, the retainer 400 is configured to have a plurality of flats 410 thereon, which may be engaged with an open ended wrench. Similarly, the nozzle tip 100 is configured to have a plurality of serrations 415 thereon to facilitate torquing of the nozzle tip 100 into the retainer 400 with a mating socket (not shown).

Figure 5:
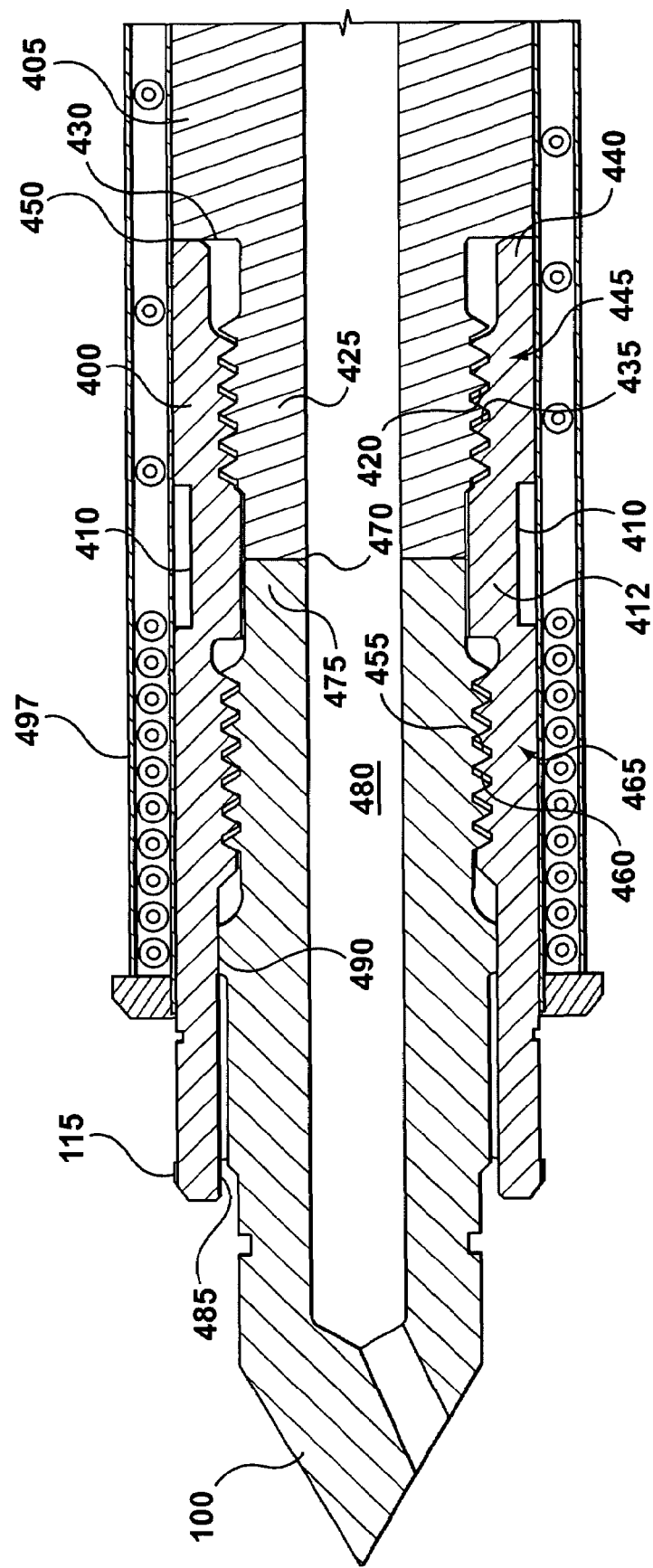
FIG. 5 is a cross-sectional view of the present invention illustrating the interaction of the nozzle, the nozzle tip and the retainer.

The embodiment of the present invention shown in the section view of FIG. 5 illustrates the interaction between the nozzle 405, the nozzle tip 100, and the retainer 400. The nozzle 405 is configured to have a nozzle thread 420, located at its gate end 425, and a nozzle shoulder 430 proximate to the nozzle thread 420. The retainer 400 is configured to have a first retainer thread 435 located at its nozzle end 440, which, when the retainer 400 is torqued, via the plurality of flats 410 located at about a midsection 412, threadably engages the retainer 400 to the nozzle 405, forming a first threaded connection 445. Additionally, an interference fit is formed when the retainer 400 abuts the nozzle shoulder 430 creating a first seal 450.

Referring still to FIG. 5, when the nozzle tip 100 is threadably installed into the retainer 400, a tip thread 455 engages a second retainer thread 460 thus forming a second threaded connection 465. Similar to the first seal 450, a second seal 470 is created when an inlet end 475 of the nozzle tip 100 is compressed sufficiently against the gate end 425 of the nozzle 405. It is this second seal 470 which initially prevents molten resin from a melt channel 480 from leaking therebetween. It is preferable that the minimum seal pressure at both the first seal 450 and the second seal 470 be at least about 20% greater than the injection pressure in the melt channel 480.

To match industry standard, it is preferred that both the first threaded connection 445 and the second threaded connection 465 each be right hand, where both the tip thread 455 and the nozzle thread 420 each be male, and both the first retainer thread 435 and the second retainer thread 460 each be female. It is recommended that the torque value used to attach the retainer 400 to the nozzle 405 be about two to four times greater than the torque value used to install the nozzle tip 100 into the retainer 400. This hierarchy of torque values will allow ease of maintenance of the hot runner nozzle system 500 by ensuring that the nozzle tip 100 can be removed from the retainer 400 without causing the retainer 400 to loosen from the nozzle 405. Conversely, the retainer 400 and nozzle tip 100 may be removed together as one from the nozzle 405 and the nozzle tip 100 may be subsequently removed from the retainer 400 utilizing the plurality of flats 410 on the retainer 400 for stability while the nozzle tip 100 is unscrewed. Additionally, the present invention allows for a heater 497 to be installed on, or removed from, the nozzle 405 without prior removal of the nozzle tip 100 or the retainer 400 and consequently, the nozzle tip 100 may also be installed in the retainer 400 without requiring removal of the heater 497.

Figure 6:
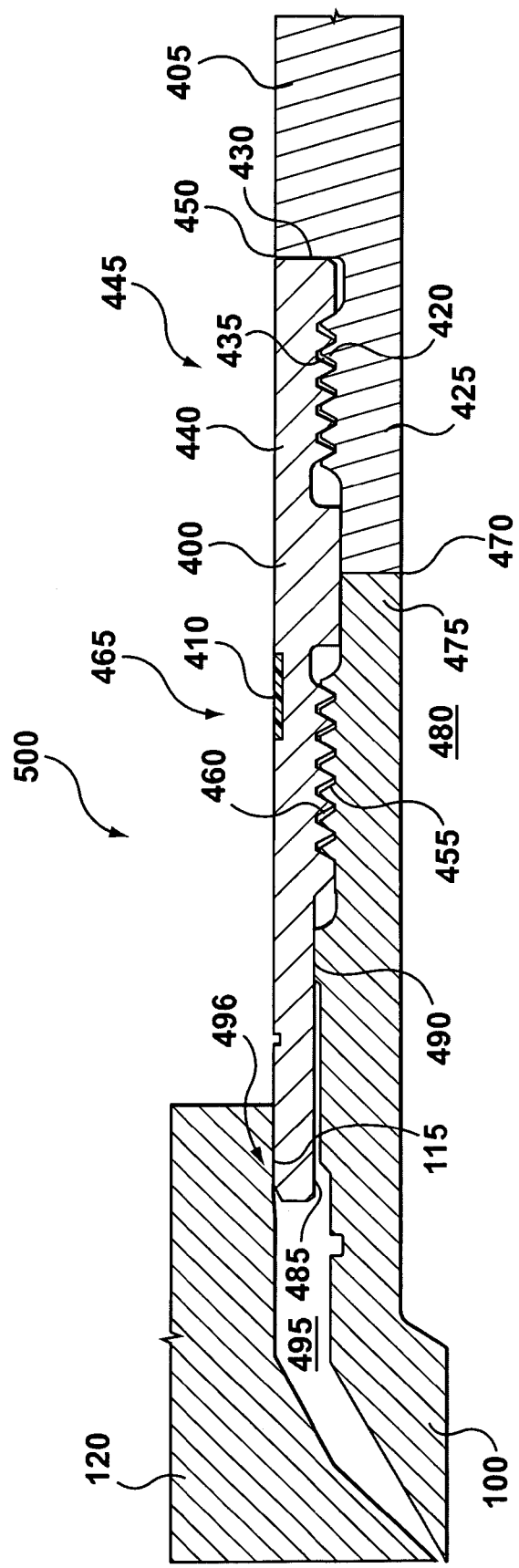
FIG. 6 is a partial cross-sectional view of the present invention illustrating the interaction of the nozzle, the nozzle tip, and the retainer with the gate insert.

An inner diameter 485 of the retainer 400 is sized such that a tip shoulder 490 may engage it to ensure proper alignment of the nozzle tip 100 while it is being torqued into the retainer 400. Located distally from the nozzle end 440 of the retainer 400 is a seal ring 115, whose function will be better understood upon viewing FIG. 6, where the present invention is shown installed in a gate insert 120. The seal ring 115 is sized to match the inner diameter of the gate insert 120, with some clearance in cold condition that is taken up once the nozzle 405 thermally expands during operation. Molten resin, under pressure, also travels from the melt channel 480 to a gate bubble area 495 which further acts against the inner diameter 485 to force the seal ring 115 of the retainer 400 against the gate insert 120 thereby forming a gate seal 496. It is this gate seal 496 which acts to prevent molten resin from leaking from the gate bubble area 495 to the exterior of the nozzle 405.

Referring to the chart of FIG. 7, while typically a nozzle housing 105 is made of AISI H-13 tool steel hardened to 42-44 Rockwell C (Rc), it is the intention of the present invention to provide flexibility in the choice of material for the retainer 400 in an effort to increase the overall longevity of the hot runner nozzle system 500. Accordingly, to increase the fatigue life of the retainer 400 from 15% to 125% respectively, it may be made from materials with higher endurance limits than that of AISI H-13 hardened to 42-44 Rc, such as AISI H-13 hardened to 49-52 Rc, Ph 13-8, Custom-465 (a steel alloy and registered trademark of the Carpenter Technology Corporation), AISI-4340, Aermet-100 (a martensitic alloy steel and registered trademark of the Carpenter Technology Corporation) or Vascomax C-300 (a specialty steel and registered trademark of the Allegany Technologies Company). These material selections allow for a seal ring 115 that is more robust and has greater wear resistance than that typical of a nozzle housing 105 and with the flexibility of replacing only the retainer 400 when necessary versus the nozzle housing 105 in its entirety when the seal ring 115 becomes worn and unusable. It may be realized that within the scope of the present invention, the retainer 400 being a separate piece and made from the more robust materials as listed previous, it is now permissible to make the nozzle 405 of the present invention from a lower grade or hardness material, such as AISI H-13 hardened to 42-44 Rc, as it is not integrated with the seal ring 115, compared to the nozzle housing 105 of FIG. 1A, thereby reducing its cost.

Figure 8:
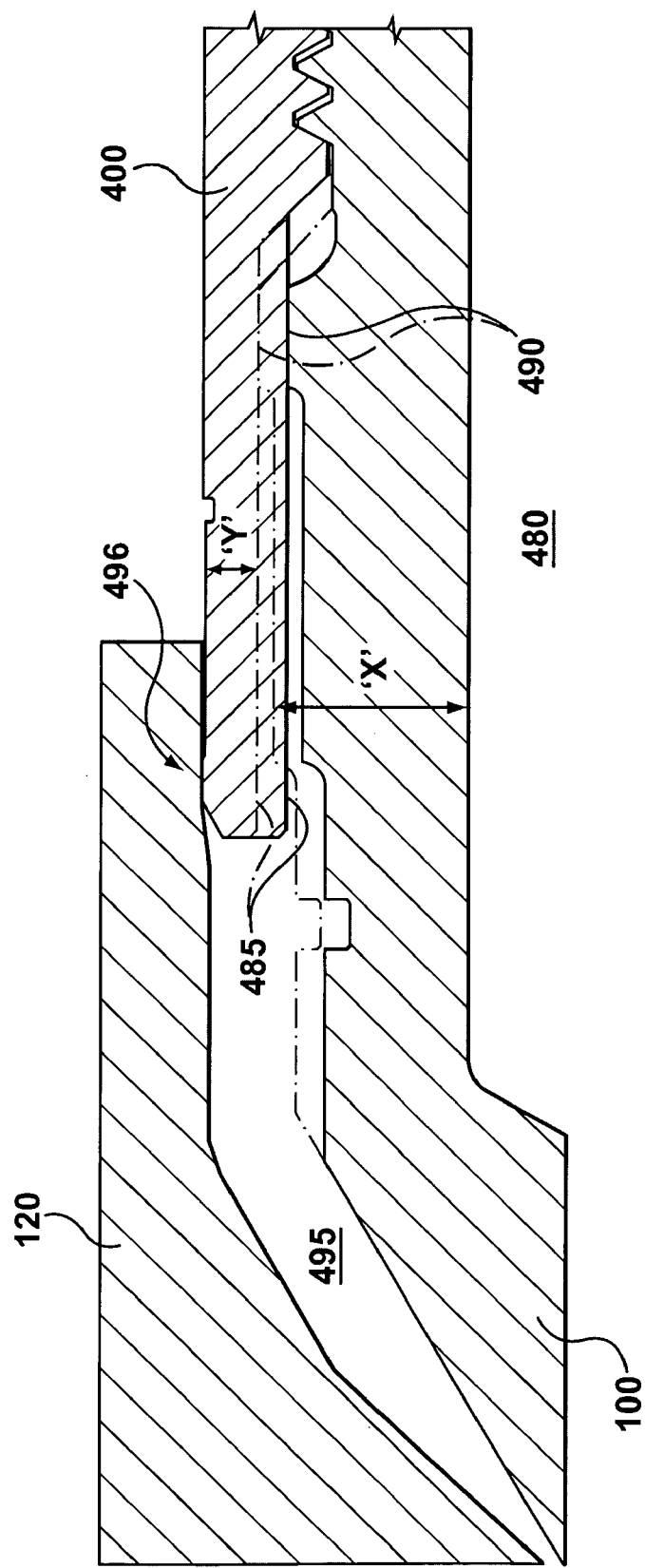
FIG. 8 is a partial cross-sectional view of the present invention illustrating an embodiment where the thicknesses of both the retainer and the nozzle tip may be optimized for high pressure applications.

Turning now to FIG. 8, since the material of the retainer 400 may be made from different material than the nozzle 405, it is another embodiment of the present invention to reduce the thickness 'Y' of the retainer 400, thereby increasing its inner diameter 485, while still maintaining the necessary mechanical properties required for extended longevity. Consequently, the thickness 'X' of the nozzle tip 100 may also be increased to afford a thicker wall section to be able to withstand higher injection pressures in the melt channel 480.

Figure 9:
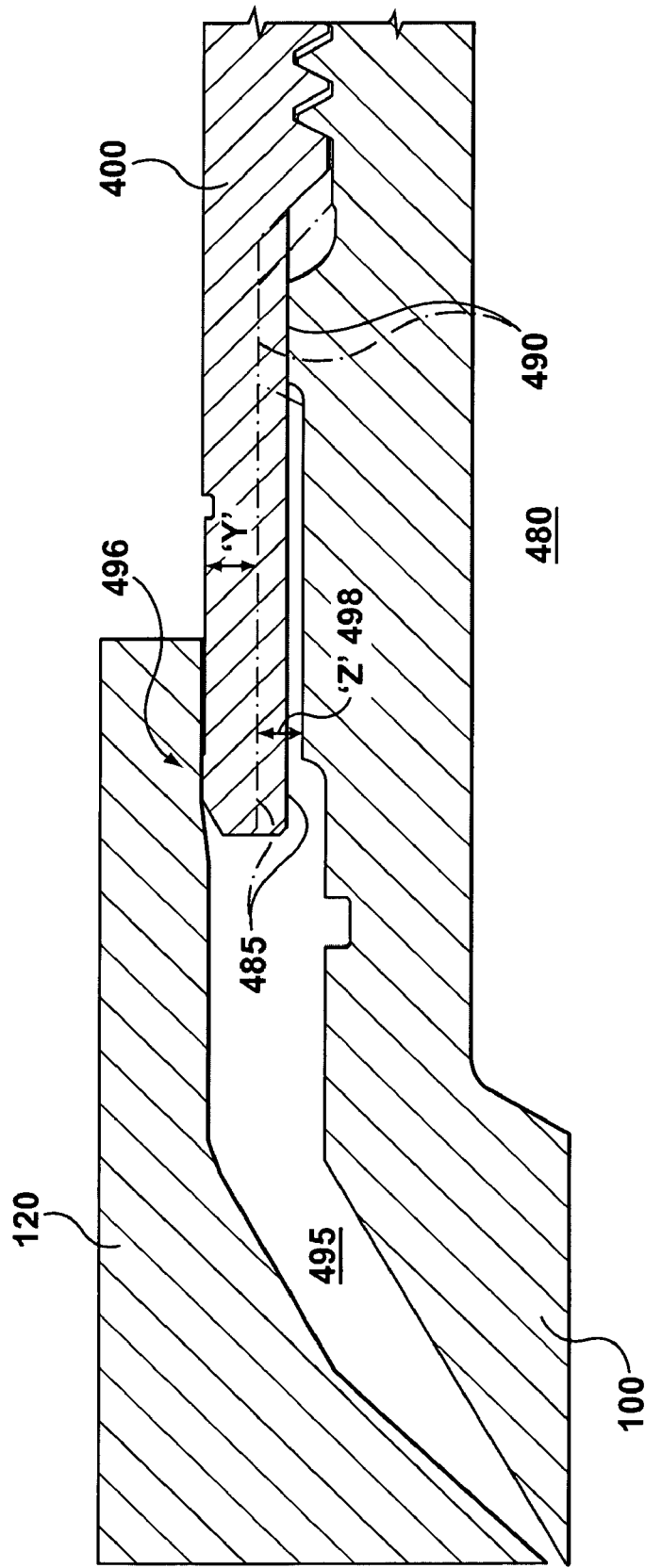
FIG. 9 is a partial cross-sectional view of the present invention illustrating an embodiment where the gap between the nozzle tip and the retainer is optimized for thermal considerations.

Referring to FIG. 9 now, yet another embodiment of the present invention illustrates, similar to FIG. 8, how, for the same reasons described previous, the thickness 'Y' of the retainer 400 is reduced while that of the nozzle tip 100 is not affected. The resulting increase of the inner diameter 485 of the retainer 400 allows for a respective increase of a gap 'Z' 498 to exist between the nozzle tip 100 and the retainer 400, thereby permitting a thicker insulative layer of resin to occupy said gap 'Z' 498 to retard the unwanted transfer of heat from nozzle tip 100 to the retainer 400.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:
1. A hot runner nozzle system (500), comprising:
a nozzle (405), having a nozzle thread (420);
a nozzle tip (100), having a tip thread (455); and
a retainer (400), having a first retainer thread (435) for removably attaching to the nozzle thread (420) of the nozzle (405), and having a second retainer thread (460) for removable attaching to the tip thread (455) of the nozzle tip (100).

2. The hot runner nozzle system (500) of claim 1, wherein the retainer (400) has a seal ring (115) located distally from the first retainer thread (435) for engagement with a gate insert (120).

3. The hot runner nozzle system (500) of claim 1, wherein the nozzle thread (420) is both right hand and male.

4. The hot runner nozzle system (500) of claim 1, wherein the tip thread (455) is both right hand and male.

5. The hot runner nozzle system (500) of claim 1, wherein the first retainer thread (435) is both right hand and female.

6. The hot runner nozzle system (500) of claim 1, wherein the second retainer thread (460) is both right hand and female.

7. The hot runner nozzle system (500) of claim 1, wherein the retainer (400) has a plurality of flats (410) thereon to facilitate torquing.

8. The hot runner nozzle system (500) of claim 1, wherein the nozzle (405) is manufactured from AISI H-13 hardened to 42-44 Rc.

9. The hot runner nozzle system (500) of claim 1, wherein the retainer (400) is manufactured from one of:
   a. AISI H-13 hardened to 49-52 Rc;
   b. AISI-4340.

* * * * *